(12) United States Patent
Raman et al.

(10) Patent No.: US 12,524,496 B2
(45) Date of Patent: Jan. 13, 2026

(54) DYNAMIC ACCESS CONTROL USING MACHINE LEARNING

(71) Applicant: Bank of America Corporation, Charlotte, NC (US)

(72) Inventors: Sundarrajan Raman, Chennai (IN); Hemamalini Rajagopalan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 1027 days.

(21) Appl. No.: 17/648,753

(22) Filed: Jan. 24, 2022

(65) Prior Publication Data

US 2023/0237126 A1 Jul. 27, 2023

(51) Int. Cl.
*G06F 18/214* (2023.01)
*G06F 15/16* (2006.01)
*G06F 21/62* (2013.01)
*G06N 10/40* (2022.01)

(52) U.S. Cl.
CPC .......... *G06F 18/2148* (2023.01); *G06F 15/16* (2013.01); *G06F 21/6218* (2013.01); *G06N 10/40* (2022.01); *G06F 2221/2141* (2013.01)

(58) Field of Classification Search
CPC .. G06F 18/2148; G06F 15/16; G06F 21/6218; G06F 2221/2141; G06N 10/40
See application file for complete search history.

(56) References Cited

U.S. PATENT DOCUMENTS

| 6,029,195 A * | 2/2000 | Herz ................ H04N 21/25891 |
| | | 348/E7.071 |
| 8,515,892 B2 | 8/2013 | Spring |
| 8,560,282 B2 * | 10/2013 | Macready .............. G06N 10/60 |
| | | 703/3 |

(Continued)

FOREIGN PATENT DOCUMENTS

| EP | 2784710 A2 * | 10/2014 | ....... G06Q 20/40145 |
| EP | 3138052 B1 | 7/2021 | |

(Continued)

OTHER PUBLICATIONS

Liu, Aodi, Du, Xuehui, Wang, Na, Efficient Access Control Permission Decision Engine Based on Machine Learning, Security and Communication Networks, 2021, 3970485, 11 pages, 2021. https://doi.org/10.1155/2021/3970485 (Year: 2021).*

(Continued)

*Primary Examiner* — Shahid K Khan

(57) ABSTRACT

A device configured to receive training data that includes user information for a plurality of users and a set of data identifiers for a plurality of data elements. The device is further configured to determine a data size for the training data is greater than a predetermined data size threshold value, and in response, send the training data to a quantum computing device. The quantum computing device is configured to train a first machine learning model using the training data. The device is further configured to receive a set of machine learning model parameters comprising a set of weight coefficients from the quantum computing device in response to training the first machine learning model and to configure a second machine learning model using the set of machine learning model parameters.

20 Claims, 4 Drawing Sheets

(56) References Cited

U.S. PATENT DOCUMENTS

| | | | |
|---|---|---|---|
| 8,875,267 | B1 | 10/2014 | Kolman et al. |
| 9,665,539 | B1 | 5/2017 | Macready et al. |
| 10,044,638 | B2 | 8/2018 | Dadashikelayeh et al. |
| 10,275,422 | B2* | 4/2019 | Israel .................. G06F 17/11 |
| 10,318,881 | B2* | 6/2019 | Rose .................. G06N 10/60 |
| 10,325,218 | B1* | 6/2019 | Zeng .................. G06N 10/00 |
| 10,339,466 | B1* | 7/2019 | Ding .................. G06N 3/044 |
| 10,484,479 | B2* | 11/2019 | Johnson .............. H04L 67/125 |
| 10,606,990 | B2 | 3/2020 | Tuli et al. |
| 10,614,370 | B2 | 4/2020 | Johnson et al. |
| 10,713,582 | B2 | 7/2020 | Dadashikelayeh |
| 10,817,796 | B2 | 10/2020 | Macready et al. |
| 11,042,811 | B2 | 6/2021 | Rolfe et al. |
| 11,049,034 | B2 | 6/2021 | Burchard et al. |
| 11,157,817 | B2* | 10/2021 | Rolfe .................. G06N 3/045 |
| 11,170,137 | B1 | 11/2021 | Thompson et al. |
| 11,178,182 | B2 | 11/2021 | Saxena et al. |
| 2008/0313430 | A1* | 12/2008 | Bunyk .................. G06N 10/40 |
| | | | 712/E9.082 |
| 2012/0254586 | A1* | 10/2012 | Amin .................. G06F 9/44 |
| | | | 712/E9.002 |
| 2013/0333002 | A1* | 12/2013 | Belton .................. H04L 63/10 |
| | | | 726/5 |
| 2014/0187427 | A1* | 7/2014 | Macready ............. G06N 7/01 |
| | | | 706/46 |
| 2015/0205759 | A1* | 7/2015 | Israel .................. G06N 10/60 |
| | | | 703/2 |
| 2015/0269383 | A1 | 9/2015 | Lang et al. |
| 2015/0317558 | A1* | 11/2015 | Adachi .................. G06N 3/04 |
| | | | 706/19 |
| 2015/0347725 | A1* | 12/2015 | Ben Ari .............. G06F 21/31 |
| | | | 726/19 |
| 2016/0180093 | A1* | 6/2016 | Goss .................. G06F 21/6218 |
| | | | 726/1 |
| 2016/0321559 | A1* | 11/2016 | Rose .................. G06N 10/60 |
| 2016/0371471 | A1* | 12/2016 | Patton .................. G06F 21/554 |
| 2017/0237747 | A1* | 8/2017 | Quinn .................. G06F 21/602 |
| | | | 726/29 |
| 2018/0069899 | A1 | 3/2018 | Lang et al. |
| 2018/0083975 | A1* | 3/2018 | Byron .................. G06F 21/32 |
| 2018/0165550 | A1* | 6/2018 | Aas .................. G06F 18/2148 |
| 2018/0267539 | A1* | 9/2018 | Shih .................. G05D 1/0295 |
| 2019/0042966 | A1* | 2/2019 | Hogaboam ............ G06N 3/049 |
| 2020/0202248 | A1* | 6/2020 | Mezzacapo ............ H03H 7/18 |
| 2020/0213336 | A1* | 7/2020 | Yu .................. H04L 63/1425 |
| 2020/0342345 | A1* | 10/2020 | Farhi .................. G06N 3/082 |
| 2021/0089955 | A1 | 3/2021 | Bondesan et al. |
| 2021/0097430 | A1* | 4/2021 | Das .................. G06N 20/00 |
| 2021/0224799 | A1* | 7/2021 | Ongpin .............. H04L 63/083 |
| 2021/0342652 | A1* | 11/2021 | Glassman ............ G06F 18/2113 |
| 2021/0342730 | A1* | 11/2021 | Redmond ............ G06N 10/40 |
| 2021/0365826 | A1 | 11/2021 | Chudak et al. |
| 2021/0383189 | A1 | 12/2021 | Cong et al. |
| 2022/0108218 | A1* | 4/2022 | Wall .................. G06N 5/01 |
| 2022/0171871 | A1* | 6/2022 | Zhong ................ G06F 21/6218 |
| 2022/0292315 | A1* | 9/2022 | Banga .................. G06N 5/01 |
| 2022/0374655 | A1* | 11/2022 | Lowe .................. G06N 20/10 |
| 2022/0414518 | A1* | 12/2022 | You .................. G06Q 10/04 |
| 2023/0041290 | A1* | 2/2023 | Cooper ............... G06F 18/217 |
| 2023/0205881 | A1* | 6/2023 | Briliauskas .......... G06F 21/565 |
| | | | 726/23 |

FOREIGN PATENT DOCUMENTS

| | | | | |
|---|---|---|---|---|
| EP | 3861488 | A4 | 11/2021 | |
| EP | 4009237 | A1 * | 6/2022 | .............. G06N 3/08 |
| JP | 2022509841 | A * | 1/2022 | .............. G06N 5/01 |
| WO | WO-2005122052 | A1 * | 12/2005 | .............. G06N 10/40 |
| WO | WO-2010148120 | A2 * | 12/2010 | .............. G06F 17/11 |
| WO | WO-2013006836 | A1 * | 1/2013 | .............. G06N 7/01 |
| WO | WO-2014210368 | A1 * | 12/2014 | .......... G06V 10/772 |
| WO | WO-2015168557 | A1 * | 11/2015 | .............. G06N 3/04 |
| WO | 2016029172 | A1 | 2/2016 | |
| WO | 2016089711 | A1 | 6/2016 | |
| WO | 2016179419 | A1 | 11/2016 | |
| WO | 2017031356 | A1 | 2/2017 | |
| WO | 2017031357 | A1 | 2/2017 | |
| WO | WO-2017132603 | A1 * | 8/2017 | .............. G06F 9/541 |
| WO | 2017179011 | A1 | 10/2017 | |
| WO | 2017214717 | A1 | 12/2017 | |
| WO | 2018160599 | A1 | 9/2018 | |
| WO | WO-2019143680 | A1 * | 7/2019 | .......... G06F 18/241 |
| WO | WO-2019157228 | A1 * | 8/2019 | .............. G06N 7/01 |
| WO | WO-2019168544 | A1 * | 9/2019 | .............. G06N 5/01 |
| WO | WO-2020047426 | A1 * | 3/2020 | .............. G06N 10/00 |
| WO | 2020161032 | A1 | 8/2020 | |

OTHER PUBLICATIONS

Liu, Aodi, Xuehui Du, and Na Wang. "Efficient access control permission decision engine based on machine learning." Security and Communication Networks 2021.1 (2021): 3970485. (Year: 2021).*

Nath, Rajdeep Kumar, Himanshu Thapliyal, and Travis S. Humble. "A review of machine learning classification using quantum annealing for real-world applications." SN Computer science 2.5 (2021): 365. (Year: 2021).*

Perdomo-Ortiz, Alejandro, et al. "Opportunities and challenges for quantum-assisted machine learning in near-term quantum computers." Quantum Science and Technology 3.3 (2018): 030502. (Year: 2018).*

Verbraeken, Joost, et al. "A survey on distributed machine learning." Acm computing surveys (csur) 53.2 (2020): 1-33. (Year: 2020).*

Otterbach, Johannes S., et al. "Unsupervised machine learning on a hybrid quantum computer." arXiv preprint arXiv:1712.05771 (2017). (Year: 2017).*

* cited by examiner

DYNAMIC ACCESS CONTROL USING MACHINE LEARNING

TECHNICAL FIELD

The present disclosure relates generally to information security, and more specifically to dynamic access control using machine learning.

BACKGROUND

In a network environment, user devices are in data communication with other devices that may be distributed anywhere in the world. These network environments allow data information to be shared among devices. Some of the technical challenges that occur when data is exchanged between devices are controlling data leakage, unauthorized access to data, and preventing malicious activities. Data storing devices, such as user devices, databases, and servers, are vulnerable to attacks. This vulnerability poses several network security challenges. Existing systems are typically unable to detect a network attack until after the attack has occurred. For example, a bad actor may upload malicious files to a device which then allows the bad actor to gain unauthorized access to other files or documents that are also stored in the device. Having a delayed response allows the bad actor to gain access to sensitive information within the network and allows bad actors to perform other malicious activities such as data exfiltration or uploading malware.

Conventional systems use an all-or-nothing approach for providing access control to data. User devices within a network are typically pre-configured with general permission settings that limit the types of data that a user has access to. Since networks may include a large number of devices, existing systems are unable to provide personalized permission settings for each device without consuming a significant amount of processing resources when configuring the permission settings for each device. Over time, permission settings may need to be frequently adjusted which places an additional strain on the number of processing resources that are available for other processes. This overconsumption of processing resources reduces the system's ability to perform other operations and reduces the throughput of the system which degrades the overall performance of the system.

SUMMARY

The disclosed system provides several practical applications and technical advantages that overcome the previously discussed technical problems. The following disclosure provides a practical application of an access control device for an information system. The disclosed access control device provides practical applications that improve the resource utilization of the information system by offloading at least a portion of a machine learning model training process to a remote quantum computing device. This process allows the information system to load balance the machine learning model training process. For example, the access control may determine to train a machine learning model locally when processing resources are available and the performance of the information system will not be negatively impacted. The access control device may also determine to train a machine learning model remotely using the quantum computing device to determine machine learning model parameters when processing resources are unavailable or the performance of the information system will be negatively impacted. This process provides load balancing that improves the throughput and overall performance of the information system.

The disclosed access control device provides practical applications that improve the information security of the information system by dynamically providing access to digital documents for a user device and allowing a user associated with the user device to request access to digital documents and/or data elements within the digital document. The disclosed information system is configured to make dynamic access control decisions for the user device based on the user associated with the user device and the content of a digital document or a data element. This process allows the information system to determine whether or not granting access to a digital document for a user will compromise the integrity and security of the information system and its resources. The disclosed information system employs a machine learning model to provide access control data for user devices in a network, which improves information security and the efficiency of the information system. The information system either grant or deny access to a digital document or data element for a user based on the response from the machine learning model. This process improves the operation of the system by offloading the access control logic to the machine learning model. This process provides a technical improvement that allows the information system to provide personalized permission settings while consuming fewer processing resources when determining whether to adjust permission settings for a user device. In other words, this process improves the operation of the information system by improving resource utilization which in turn improves the throughput and the overall operation of the information system.

Improving information security for the information system also improves the underlying network and the devices within the network. For example, when a data exfiltration attack occurs, there is an increase in the number of network resources and bandwidth that are consumed which reduces the throughput of the network. By preventing data exfiltration attacks, the information system can prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the information system prevents any comprised devices from being taken out of service due to an attack that would otherwise negatively impact the performance and throughput of the network.

In one embodiment, the information system comprises an access control device that is configured to receive training data that includes user information for a plurality of users and a set of data identifiers for a plurality of data elements. The access control device is further configured to determine a data size for the training data is greater than a predetermined data size threshold value, and in response, send the training data to a quantum computing device. The quantum computing device is configured to train a first machine learning model using the training data. The access control device is further configured to receive a set of machine learning model parameters comprising a set of weight coefficients from the quantum computing device in response to training the first machine learning model and to configure a second machine learning model using the set of machine learning model parameters.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Information System Overview

Figure 1:
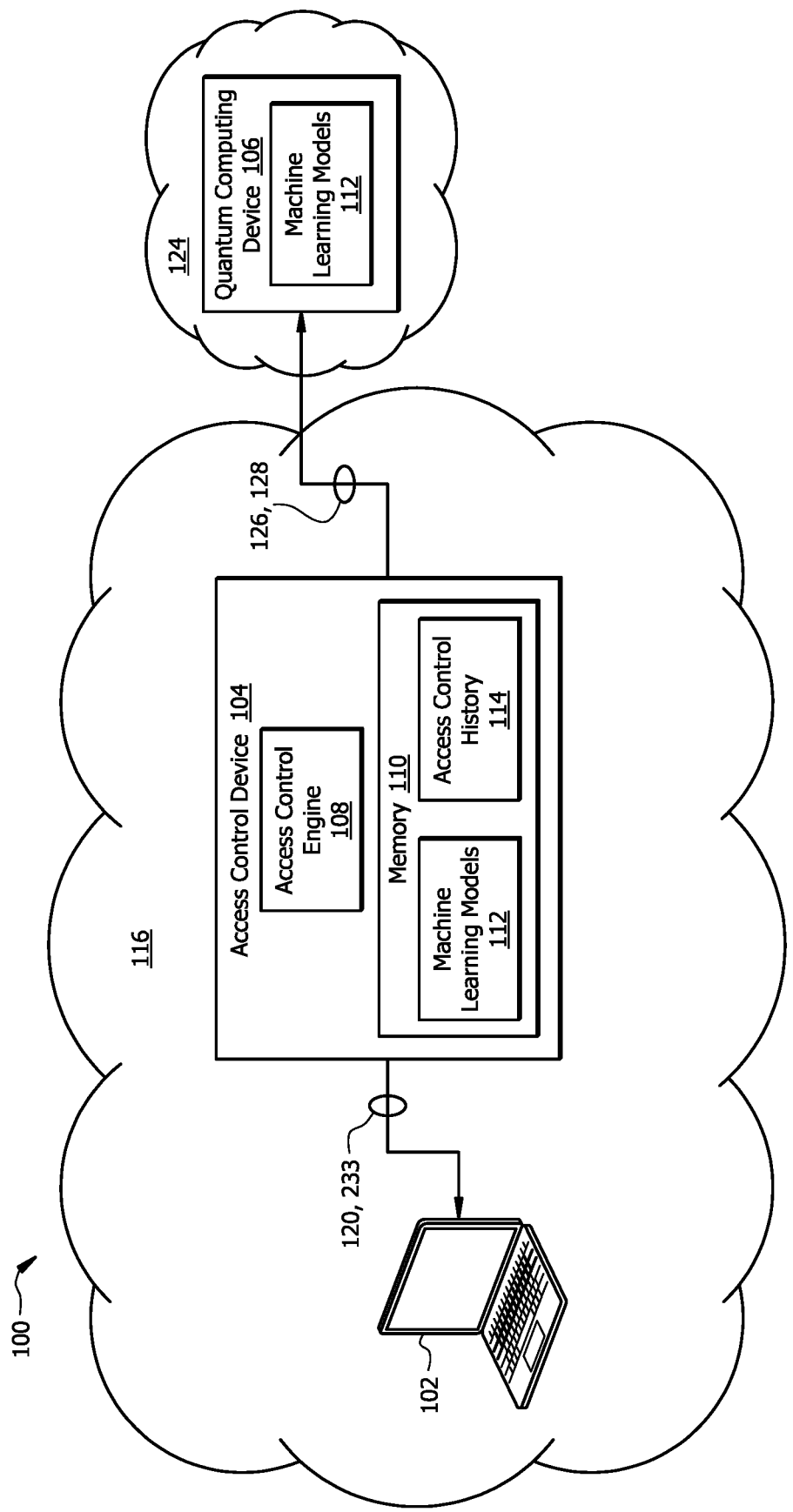
FIG. 1 is a schematic diagram for an information system configured to use an access control device.

FIG. 1 is a schematic diagram of an embodiment of an information system 100 that is generally configured to generate machine learning model parameters 128 that can be used to configure a machine learning model 112 for processing requests from one or more users to access a digital document or data elements within a digital document. The information system 100 is configured to determine how to efficiently train a machine learning model 112 locally or remotely using a quantum computing device 106 to generate a set of machine learning model parameters 128 based on the data size of a set of training data 126 and the computation resources that are required to determine the machine learning model parameters 128. The information system 100 is further configured to provide access to digital documents for a user device 102 and to allow a user associated with the user device 102 to request access to a digital document or data elements within the digital document. In some embodiments, a digital document may contain one or more masked data elements that have values that are not visible or accessible to a user. For example, a data element may be masked by obfuscating, encrypting, or hiding the data element within the digital document. Masking the data element prevents the user from identifying any values that are associated with the data element. When the information system 100 receives a request to access a digital document or a data element, the information system 100 is configured to employ a machine learning model 112 that is configured to determine whether the user is authorized to access the digital document or data element. The information system 100 is further configured to either grant or deny access to the digital document or data element based on the response from the machine learning model 112. This process allows the information system 100 to offload some of the access control logic to the machine learning model 112 which is configured to dynamically determine whether a user is authorized to access a digital document or data elements based on various types of information that are associated with the user.

In one embodiment, the information system 100 comprises one or more user devices 102, an access control device 104, and one or more quantum computing devices 106. The user devices 102 and the access control device 104 are in signal communication with each other within a network 116. The network 116 allows communication between and amongst the various components of the information system 100. This disclosure contemplates the network 116 being any suitable network operable to facilitate communication between the components of the information system 100. The network 116 may include any interconnecting system capable of transmitting audio, video, signals, data, messages, or any combination of the preceding. The network 116 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

User Devices

A user device 102 is generally configured to provide hardware and software resources to a user. Examples of the user device 102 include, but are not limited to, a smartphone, a tablet, a laptop, a computer, a smart device, an augmented reality device, a virtual reality device, or any other suitable type of device. The user device 102 comprises a graphical user interface (e.g. a display or a touchscreen) that allows a user to view files or digital documents on the user device 102. The user device 102 may comprise a touchscreen, a touchpad, keys, buttons, a mouse, or any other suitable type of hardware that allows a user to provide inputs into the user device 102. The user device 102 is configured to allow the user to send an access control request 120 to the access control device 104 to request access to digital documents and/or data elements within a digital document. Examples of digital documents include, but are not limited to, text files, tables, charts, presentations, images, files, documents, or any other suitable type of digital data. In response to sending the access control request 120 to the access control device 104, the user device 102 is configured to receive an access response 122 that indicates whether a user is authorized to access requested a digital document or a data element within a digital document. In some embodiments, the access response 122 comprises machine-executable instructions that can be executed by the user device 102 to enable a user to access a requested digital document or a data element within a digital document.

Quantum Computing Device

The quantum computing device 106 may comprise a quantum processing unit (QPU), a qubit signal amplifier, input microwave lines, superconducting coaxial lines, a mixing chamber, cryogenic isolators, quantum amplifiers, a cryoperm shield, quantum logical gates, and/or any other suitable components for generating and/or processing quantum bits, which are referred to as qubits herein. In some embodiments, the quantum computing device 106 may be located within a quantum network 124. The quantum network 124 may comprise optical fibers, optical switches, repeaters, and/or any suitable type of hardware and communication channels for transmitting and receiving qubits.

The quantum computing device 106 is also configured to be in signal communication with the access control device 104. In this configuration, the quantum computing device 106 is configured to exchange (i.e. send and receive) binary data with the access control device 104. In one embodiment, the quantum computing device 106 is configured to receive binary data and to convert the binary data to qubits for processing. For example, the quantum computing device 106 may be configured to receive training data 126 from the access control device 104. The quantum computing device 106 is further configured to convert the training data 126 from a binary data format into a quantum bit format (i.e. qubits). The quantum computing device 106 is further configured to use the training data 126 to train a machine learning model 112 to solve for a local minima and/or a global minima for the training data 126. Through the machine learning model training process, the quantum computing device 106 is configured to determine machine learning model parameters 128 (e.g. weights and bias values) that correspond with a local minima and/or a global minima for the training data 126. After determining the machine learning model parameters 128, the quantum computing device 106 is further configured to send the machine learning model parameters 128 to the access control device 104. In response to receiving the machine learning model parameters 128 from the quantum computing device 106, the access control device 104 configures a machine learning model 112 that is stored locally in the access control device 104 using the machine learning model parameters 128. This process allows the access control device 104 to offload a portion of the machine learning model training process to obtain machine learning model parameters 128 that correspond with a local minima and/or a global minima. An example of the quantum computing device 106 in operation is described in FIG. 2. In some embodiment, the quantum computing device 106 may be integrated with or configured to work cooperatively with a traditional computing device such as a desktop computer or a laptop.

Access Control Device

Examples of an access control device 104 include, but are not limited to, a server, an access point, a computer, or any other suitable type of network device. In one embodiment, an access control device 104 comprises an access control engine 108 and a memory 110. Additional details about the hardware configuration of the access control device 104 are described in FIG. 4. The memory 110 is configured to store machine learning models 112, access control history 114, and/or any other suitable type of data.

In one embodiment, the access control engine 108 is generally configured to provide access to digital documents for user device 102. Providing access to the digital documents allows a user to view, interact, and modify data elements (e.g. data fields, text, graphs, tables, etc.) within digital documents using their user device 102. The access control engine 108 is configured to receive access control requests 120 for accessing digital documents and/or data elements within the digital document. In response to receiving an access control request 120, the access control engine 108 is further configured to employ a machine learning model 112 to determine whether the user is authorized to access a digital document or a data element within a digital document. In response to determining that a user is authorized to access a digital document or a data element within a digital document, the access control engine 108 is further configured to provide access to the requested digital document or data element. An example of the access control engine 108 performing this operation is described in more detail in FIG. 3.

Examples of machine learning models 112 include, but are not limited to, a multi-layer perceptron, a recurrent neural network (RNN), an RNN long short-term memory (LSTM), a convolutional neural network (CNN), a regression model (e.g. a linear regression or a non-linear regression), or any other suitable type of neural network model. In one embodiment, the machine learning model 112 is generally configured to receive user information identifying a user and a data identifier that identifies a digital document or a data element as an input. The machine learning model 112 is further configured to output an access response 122 that indicates whether a user is authorized to access a digital document or a data element within a digital document based on the provided input. In some embodiments, the access response 122 may comprise machine-executable instructions. As an example, the access response may comprise machine-executable instructions for modifying a digital document to provide access to the digital document or a data element within the digital document. For instance, the machine-executable instructions may comprise an encryption key for deobfuscating or decrypting a digital document or a data element. As another example, the access response may comprise machine-executable instructions for modifying permission settings on the user device 102 for the user. The permission settings may comprise network settings, security settings, hardware settings, software settings, any other suitable type or combination of settings for the user device 102.

The machine learning model 112 is trained using training data 126 that comprises different types of user information, data element information (e.g. data element identifiers), and/or any other suitable type of information. During the training process, the machine learning model 112 determines weights and bias values that allow the machine learning model 112 to identify either an approval or denial to an access request for a user based on the information that is input to the machine learning model 112. Through this process, the machine learning model 112 is able to determine whether a user is approved to access a digital document or a data element based on the information input into the machine learning model 112. The access control engine 108 may be configured to train the machine learning models 112 using any suitable technique. In some embodiments, machine learning models 112 may be stored and/or trained by a device that is external from the access control device 104. An example of a machine learning model training process is described in more detail in FIG. 2.

The access control history 114 generally comprises access responses 122 that were previously determined by a machine learning model 112. Each access response 122 indicates whether a user is authorized or approved to access a requested digital document or data element within a digital document. For example, each time a machine learning model 112 computes an access response 122, the access control device 104 associates the access response 122 with the user information and the data element identifiers that were provided to generate the access response 122. For instance, the access control device 104 may store an association between user information, data element identifiers, and a corresponding access response 122 that indicates whether a user is authorized or approved to access a digital document or data element. The access control history 114 may further comprise machine-executable instructions corresponding with an access response 122 or any other suitable type of information that is associated with an access control request 120 and/or an access response 122.

Machine Learning Model Training Process

Figure 2:
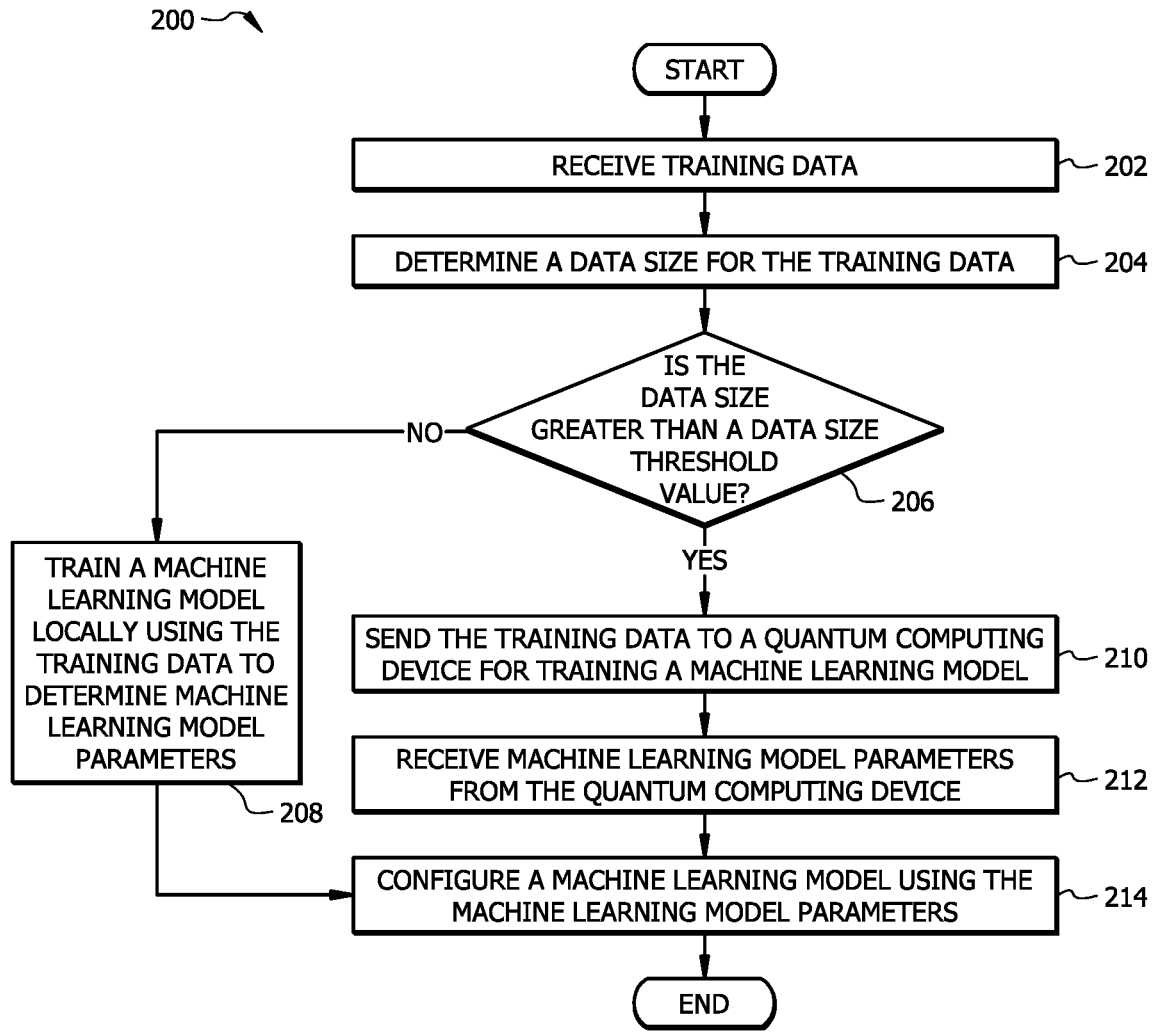
FIG. 2 is a flowchart of an embodiment of a machine learning model training process for the information system.

FIG. 2 is a flowchart of an embodiment of a machine learning model training process 200 for the information system 100. The information system 100 may employ process 200 to generate machine learning model parameters 128 that can be used to configure a machine learning model 112. The information system 100 employ process 200 to determine how to efficiently train a machine learning model 112 to generate the machine learning model parameters 128 based on the data size of the training data 126 and computation resources that are required to determine the machine learning model parameters 128.

At operation 202, the access control device 104 receives training data 126. In one embodiment, the training data 126 comprises a set of user information associated with a plurality of users and a plurality of data element identifiers that each identify a digital document and/or a data element within a digital document. The user information may comprise a user identifier (e.g. name, account number, employee number, or an alphanumeric code), account information, network permission information, user device configuration information, group or department information, personal information, or any other information that is associated with a user. A data element identifier may comprise a file name, a file location, a data field name, or any other suitable type of information that is associated with a digital document or a data element.

At operation 204, the access control device 104 determines a data size for the training data 126. In one embodiment, the access control device 104 determines the data size for the training data 126 based on the number of entries in the training data 126. For example, the training data 126 may comprise a plurality of entries that each correspond with a user's request to access a digital document or data element. In this example, the access control device 104 counts the number of entries in the training data 126 to determine the data size for the training data 126.

At operation 206, the access control device 104 determines whether the data size is greater than a data size threshold value. The data size threshold value is a user-defined value that may be set to any suitable value. For example, the data size threshold value may be set to 100 entries, 250 entries, 1,000 entries, 10,000 entries, 100,000 entries, or any other suitable value. Here, the access control device 104 compares the determined data size from operation 204 to the data size threshold value. The access control device 104 proceeds to operation 208 in response to determining that the data size is less than the data size threshold value. In this case, the access control device 104 determines that the training data 126 can be used to train a machine learning model 112 locally by the access control device 104.

At operation 208, the access control device 104 trains a machine learning model 112 locally using the training data 126 to determine machine learning model parameters 128. The machine learning model parameters 128 may comprise hyperparameters, weight values, bias values, or any other suitable type of parameters or configuration settings for a machine learning model 112. During the training process, the machine learning model 112 determines machine learning model parameter values that allow the machine learning model 112 to indicate either an approval or denial to an access request for a user based on the information that is input to the machine learning model 112. Through this process, the machine learning model 112 is able to determine whether a user is approved to access a digital document or a data element based on the information input into the machine learning model 112. The access control device 104 may be configured to train the machine learning models 112 using any suitable technique.

The machine learning model parameters 128 that are obtained by training the machine learning model 112 locally may correspond with a local minima or a global minima. In general, the machine learning model parameters 128 that correspond with the global minima provide the best performance and accuracy. However, determining machine learning model parameters 128 for the global minima is computationally intensive for large training data sets and may not be possible without negatively impacting the performance of the access control device 104 and the information system 100. The machine learning model parameters 128 that correspond with the local minima may not provide the same level of performance or accuracy as the machine learning model parameters 128 for the global minima. However, the tradeoff is that determining machine learning model parameters 128 for the local minima is less computationally intensive for smaller training data sets and can be performed without negatively impacting the performance of the access control device 104 and the information system 100.

Returning to operation 206, the access control device 104 proceeds to operation 210 in response to determining that the data size is greater than the data size threshold value. In this case, the access control device 104 determines that the training data 126 is too large to use to train a machine learning model 112 locally without negatively impacting the performance of the access control device 104 and the information system 100 and offloads the machine learning model training to the quantum computing device 106.

At operation 210, the access control device 104 sends the training data 126 to the quantum computing device 106 for training a machine learning model 112. In response to receiving the training data 126, the quantum computing device 106 first converts the training data 126 from a binary data format to a qubit data format. The quantum computing device 106 may convert the training data 126 from a binary data format to a qubit data format using any suitable technique. During the training process, the quantum computing device 106 determines machine learning model parameter values that allow the machine learning model 112 to indicate either an approval or denial to an access request for a user based on the information that is input to the machine learning model 112. The quantum computing device 106 may be configured to train the machine learning models 112 using any suitable technique. Since the quantum computing device 106 is able to process training data 126 more efficiently using qubits, the quantum computing device 106 is able to efficiently determine machine learning model parameters 128 that correspond with a global minima. After determining the machine learning model parameters 128, the quantum computing device 106 sends the machine learning model parameters 128 to the access control device 104 in a binary data format which allows the access control device 104 to interpret and use the machine learning model parameters 128. At operation 212, the access control device 104 receives machine learning model parameters 128 from the quantum computing device 106.

At operation 214, the access control device 104 configures a machine learning model 112 using the machine learning model parameters 128. The access control device 104 may configure the machine learning model 112 using machine learning model parameters 128 that were determined locally by the access control device 104 in operation 208 or that were determined remotely by the quantum computing device 106 in operation 210. The machine learning model parameters 128 may correspond with a local minima or a global minima. The access control device 104 may configure the machine learning model 112 by setting its configuration settings to values that correspond with the values in the machine learning model parameters 128. For example, the access control device 104 may set weight values for the machine learning model 112 to corresponding weight values from the determined machine learning model parameters 128.

In some embodiments, the access control device 104 may configure multiple machine learning models 112 based on machine learning model parameters 128 that correspond with both a global minima and a local minima. For example, the access control device 104 may configure a first machine learning model 112 using a first set of machine learning model parameters 128 for a local minima that were determined by training a machine learning model 112 locally. The access control device 104 may also configure a second machine learning model 112 using a second set of machine learning model parameters 128 for a global minima that were determined remotely by the quantum computing device 106. The access control device 104 may repeat this process to train any suitable number of machine learning models 112 using machine learning model parameters that correspond with a local minima or a global minima. After configuring one or more machine learning models 112, the access control device 104 may use the machine learning models 112 to handle access control requests 120 using a process such as process 300 that is described below in FIG. 3.

Data Access Process

Figure 3:
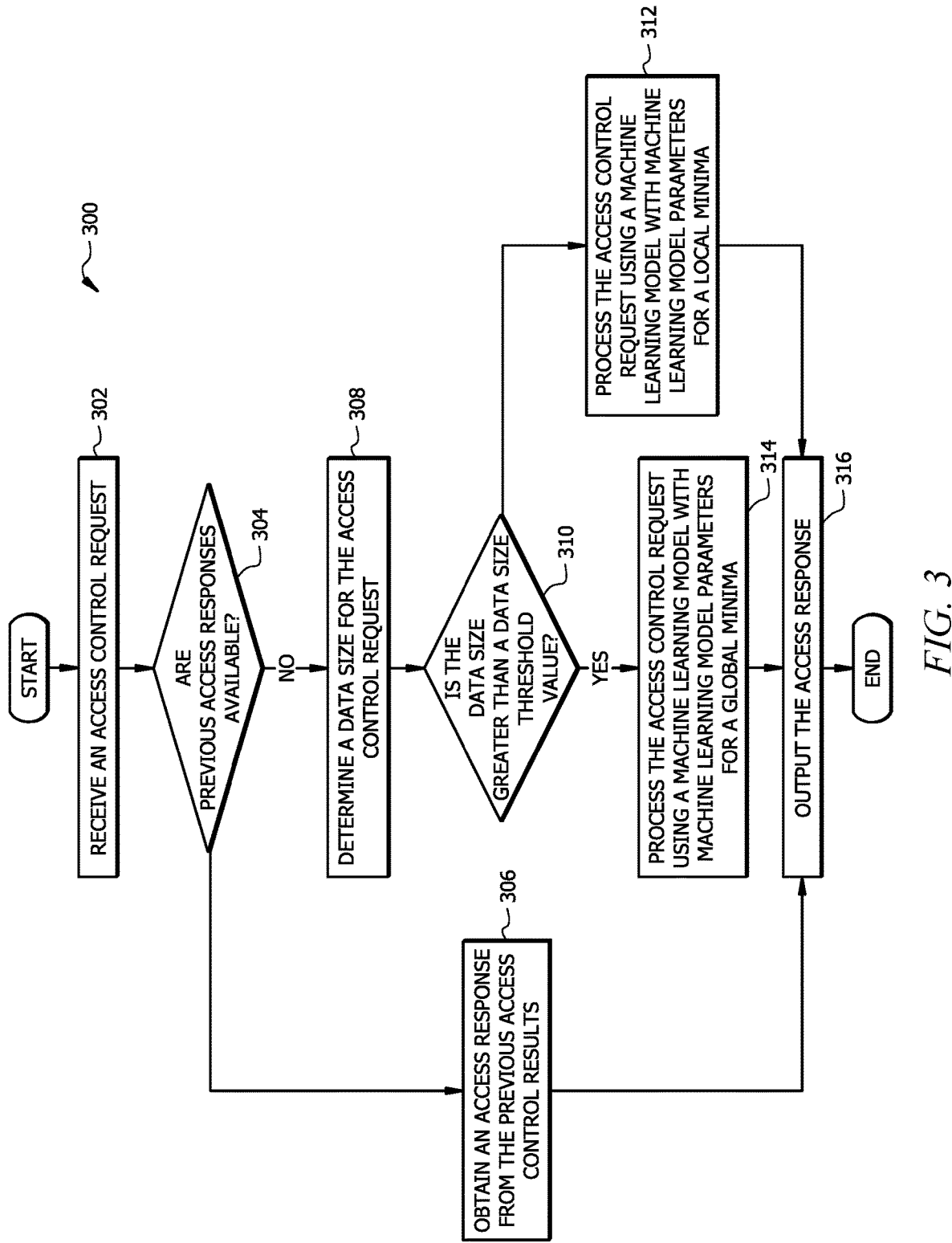
FIG. 3 is a flowchart of an embodiment of a data access control process for the information system.

FIG. 3 is a flowchart of an embodiment of a data access process 300 for the information system 100. The information system 100 may employ process 300 to provide access to digital documents for a user device 102 and to allow a user associated with the user device 102 to request access to a digital document or data elements within the digital document. In response to receiving an access control request 120 to access a digital document or a data element, the information system 100 will employ process 300 to employ a machine learning model 112 that is configured to determine whether the user is authorized to access the digital document or data element. Process 300 will then either grant or deny access to the digital document or data element based on the response from the machine learning model 112. This process allows the information system 100 to dynamically determine whether a user is authorized to access digital documents and data elements based on various types of information that are associated with the user.

At operation 302, the access control device 104 receives an access control request 120. In one embodiment, the access control request 120 comprises a plurality of entries that each correspond with a user's request to access a digital document or data element. For example, each entry in the access control request 120 may include user information that comprises a user identifier and a data element identifier that is associated with a digital document and/or a data element within a digital document that a user is requesting permission to access.

At operation 304, the access control device 104 determines whether there are any previous access responses 122 available for the access control request 120. Here, the access control device 104 compares the combination of user information and the data element identifiers to the user information and data element identifiers that are associated with previously determined access responses 122 in the access control history 114. Each access response 122 indicates whether a user is authorized or approved to access a digital document or a data element within a digital document. For example, the access control device 104 may use at least a portion of the user information and the data element identifiers from the access control request 120 as a search token to look for matches within the previously determined access responses 122 in the access control history 114. The access control device 104 determines that a previous access response 122 is available when a match is found between the user information and the data element identifiers in the access control request 120 and the user information and data element identifiers that are associated with a previously determined access response 122.

The access control device 104 proceeds to operation 306 in response to determining that there are previous access responses 122 available for the access control request 120. In this case, the access control device 104 proceeds to operation 306 to obtain a previous access response 122 to reuse instead of processing the access control request 120 using a machine learning model 112. At operation 306, the access control device 104 obtains an access response 122 from among the previously determined access responses 122. Here, the access control device 104 obtains the identified previous access response 122 that matches the user information and the data element identifiers in the access control request 120 and proceeds to operation 316 to send the previous access response 122 to the user device 102. This process leverages previously determined access response 122 to avoid redundant computations that would otherwise consume the processing resources of the access control device 104.

Returning to operation 304, the access control device 104 proceeds to operation 308 in response to determining that there are no previous access responses 122 available. In this case, the access control device 104 proceeds to operation 308 to process the access control request 120 using a machine learning model 112. At operation 308, the access control device 104 determines a data size for the access control request 120. In one embodiment, the access control device 104 determines the data size for the access control request 120 based on the number of entries in the access control request 120. In this example, the access control device 104 counts the number of entries in the access control request 120 to determine the data size for the access control request 120.

At operation 310, the access control device 104 determines whether the data size is greater than a data size threshold value. The data size threshold value may be the same data threshold value that was used in operation 206 in FIG. 2 or a different user-defined value. Here, the access control device 104 compares the data size of the access control request 120 that was determined in operation 308 to the data size threshold value. The access control device 104 proceeds to operation 312 in response to determining that the data size is less than the data size threshold value. In this case, the access control device 104 determines that the access control request 120 can be processed using a machine learning model 112 that is configured with machine learning model parameters 128 that correspond with a local minima. Here, the access control device 104 determines that level of performance and accuracy that is provided by the machine learning model 112 that is configured with machine learning model parameters 128 that correspond with a local minima is sufficient based on the data size of the access control request 120.

At operation 312, the access control device 104 processes the access control request 120 using a machine learning model 112 with machine learning model parameters 128 for a local minima. The access control device 104 processes the access control request 120 by inputting the user information and the data element identifiers from the access control request 120 into the machine learning model 112 that is configured with machine learning model parameters 128 for a local minima. In response to inputting the user information and the data element identifiers into the machine learning model 112, the access control device 104 receives an access response 122 from the machine learning model 112. The access response 122 indicates whether a user is authorized to access requested a digital document or a data element within a digital document. For example, the access response 122 may comprise a plurality of entries that correspond with the entries in the access control request 120. In this example, each entry in the access response 122 indicates whether a user is approved for accessing a requested digital document or data element that was requested in a corresponding entry in the access control request 120. Each entry in the access response 122 may comprise a flag bit or an alphanumeric value that indicates whether the user is approved for accessing a requested digital document or data element. For instance, an entry may comprise a first alphanumeric value to indicate that a user is approved and a different second alphanumeric value to indicate that a user is not approved. In other examples, the entry may comprise any other suitable type of value to indicate whether the user is approved for accessing a requested digital document or data element.

In some embodiment, the access response 122 may comprise executing machine-executable instructions 406 that are provided by the machine learning model 112. For example, the access response 122 comprises machine-executable instructions for modifying the digital document to provide access to the digital document or a data element in a digital document for a user. As another example, the access response 122 comprises machine-executable instructions for modifying permission settings on the user device 102 to provide access to a digital document or a data element in a digital document for the user. The permission settings may comprise network settings, security settings, hardware settings, software settings, any other suitable type or combination of settings for a user device 102. In other examples, the access response 122 may comprise any other suitable type of machine-executable instructions to provide access to a digital document or a data element for a user.

Returning to operation 310, the access control device 104 proceeds to operation 314 in response to determining that the data size is greater than the data size threshold value. In this case, the access control device 104 determines that the access control request 120 cannot be processed using a machine learning model 112 that is configured with machine learning model parameters 128 that correspond with a local minima. Here, the access control device 104 determines that level of performance and accuracy that is provided by the machine learning model 112 that is configured with machine learning model parameters 128 that correspond with a local minima is insufficient based on the data size of the access control request 120. This means that the access control device 104 will instead use a machine learning model 112 that is configured with machine learning model 112 parameters that correspond with a global minima which are able to provide a higher level of performance and accuracy.

At operation 314, the access control device 104 processes the access control request 120 using a machine learning model 112 with machine learning model parameters 128 for a global minima. The access control device 104 processes the access control request 120 by inputting the user information and the data element identifiers from the access control request 120 into the machine learning model 112 that is configured with machine learning model parameters 128 for a global minima. In response to inputting the user information and the data element identifiers into the machine learning model 112, the access control device 104 receives an access response 122 from the machine learning model 112. The access response 122 is configured similar to the access response 122 that is described in operation 312.

At operation 316, the access control device 104 outputs the access response 122 to the user device 102. Here, the access control device 104 sends the access response 122 to the user device 102 for processing. In response to receiving the access response 122, the user device 102 may execute any instructions that are provided by the access response 122 to grant or deny access to a digital document or data element for a user. For example, the user device 102 may execute machine-executable instructions to modify a digital document to provide access to the digital document or a data element in a digital document for a user. As another example, the user device 102 may execute machine-executable instructions to modify permission settings on the user device 102 to provide access to a digital document or a data element in a digital document for the user. The permission settings may comprise network settings, security settings, hardware settings, software settings, any other suitable type or combination of settings for a user device 102. In other examples, the user device 102 may execute any other suitable type of machine-executable instructions to provide or restrict access to a digital document or a data element for a user.

Hardware Configuration for the Access Control Device

Figure 4:
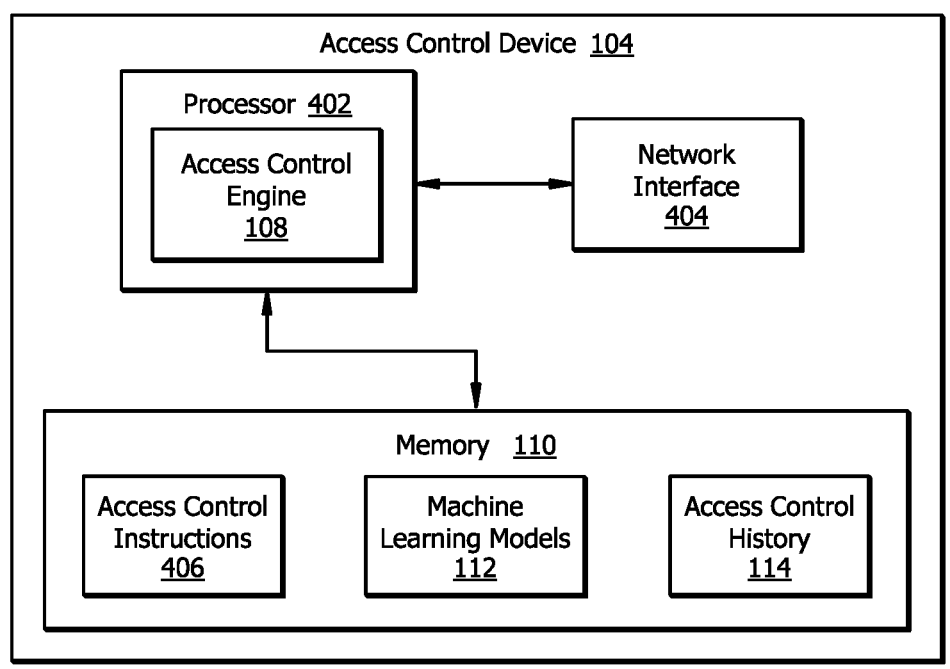
FIG. 4 is an embodiment of an access control device for the information system.

FIG. 4 is an embodiment of an access control device 104 for the information system 100. As an example, the access control device 104 may be a server or a computer. The access control device 104 comprises a processor 402, a memory 110, and a network interface 404. The access control device 104 may be configured as shown or in any other suitable configuration.

Processor

The processor 402 is a hardware device that comprises one or more processors operably coupled to the memory 110. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 110 and the network interface 404. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute access control instructions 406 to implement the access control engine 108. In this way, processor 402 may be a special-purpose computer designed to implement the functions disclosed herein. In an embodiment, the access control engine 108 is implemented using logic units, FPGAs, ASICs, DSPs, or any other suitable hardware. The access control engine 108 is configured to operate as described in FIGS. 1-3. For example, the access control engine 108 may be configured to perform the steps of process 200 and 300 as described in FIGS. 2 and 3, respectively.

Memory

The memory 110 is a hardware device that is operable to store any of the information described above with respect to FIGS. 1-3 along with any other data, instructions, logic, rules, or code operable to implement the function(s) described herein when executed by the processor 402. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store access control instructions 406, machine learning models 112, access control history 114, and/or any other data or instructions. The access control instructions 406 may comprise any suitable set of instructions, logic, rules, or code operable to execute the access control engine 108. The machine learning models 112 and the access control history 114 are configured similar to the machine learning models 112 and the access control history 114 described in FIGS. 1-3, respectively.

Network Interface

The network interface 404 is a hardware device that is configured to enable wired and/or wireless communications. The network interface 404 is configured to communicate data between user devices 102, quantum computing devices 106, and other devices, systems, or domains. For example, the network interface 404 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control device, comprising:
a memory operable to store a plurality of machine learning models, wherein each machine learning model is configured to:
receive user information identifying a user and a data identifier identifying a data element; and
output an access response indicating whether the user is approved for accessing the data element; and
a processor operably coupled to the memory, configured to:
receive a first training data comprising a first set of user information for a first plurality of users and a first set of data identifiers for a first plurality of data elements;
determine a first data size for the first training data based at least in part on a number of entries in the first training data;
compare the first data size to a predetermined data size threshold value;
determine the first data size is greater than the predetermined data size threshold value;
send the first training data to a quantum computing device in response to determining that the first data size is greater than the predetermined data size threshold value, wherein:
the quantum computing device is configured to process data using quantum bits; and
the quantum computing device is configured to train a first machine learning model using the first training data;
receive a first set of machine learning model parameters comprising a first set of weight coefficients from the quantum computing device in response to training the first machine learning model, wherein the first set of machine learning model parameters correspond with a global minima value for the first training data;
configure a second machine learning model from among the plurality of machine learning models using the first set of machine learning model parameters;
receive an access control request comprising a plurality of entries, wherein each entry identifies:
data identifiers for a plurality of data elements; and
user information comprising user identifiers for a plurality of users, wherein each user identifier is linked with one or more data identifiers for data elements a corresponding user is requesting permission to access;
determine if a second data size of the access control request is greater than the predetermined data size threshold value, wherein the second data size is determined based on a number of entries in the access control request; and in response to determining that the second data size of the access control request is greater than the predetermined data size threshold value, utilize the second machine learning model to determine if each of the user identifiers is approved to access a corresponding data element linked with the one or more data identifiers, wherein the second machine learning model is configured with the first set of machine learning model parameters that correspond with the global minima value.

2. The device of claim 1, wherein the processor is further configured to:
receive a second training data comprising a second set of user information for a second plurality of users and a second set of data identifiers for a second plurality of data elements;
determine a third data size for the second training data based at least in part on a number of entries in the second training data;
compare the third data size to the predetermined data size threshold value;
determine the third data size is less than or equal to the predetermined data size threshold value;
train a third machine learning model locally using the second training data in response to determining that the first data size is less than or equal to the predetermined data size threshold value, wherein training the third machine learning model locally generates a second set of machine learning model parameters comprising a second set of weight coefficients that correspond with a local minima value for the second training data; and
configure a fourth machine learning model from among the plurality of machine learning models using the second set of machine learning model parameters.

3. The device of claim 1, wherein the processor is further configured to:
select a machine learning model from among the plurality of machine learning models based on the number of entries in the access control request, wherein:
the selected machine learning model is configured to use machine learning model parameters for a local minima when the number of entries in the access control request is less than or equal to the predetermined data size threshold value;
input the user information and the data identifiers into the selected machine learning model; and
obtain an access response from the selected machine learning model in response to inputting the user information and the data identifiers into the selected machine learning model, wherein the access response indicates whether each user identifier is approved for accessing a data element.

4. The device of claim 3, wherein the access response comprises machine-executable instructions for decrypting an encrypted data element within a digital document.

5. The device of claim 3, wherein the access response comprises machine-executable instructions for modifying a digital document to provide access to a data element within the digital document.

6. The device of claim 3, wherein the access response comprises machine-executable instructions for modifying a digital document to provide access to the digital document.

7. The device of claim 1, wherein the access response comprises machine-executable instructions for modifying permission settings on a user device for the user.

8. A data access control method, comprising:
receiving a first training data comprising a first set of user information for a first plurality of users and a first set of data identifiers for a first plurality of data elements;
determining a first data size for the first training data based at least in part on a number of entries in the first training data;
comparing the first data size to a predetermined data size threshold value;
determining the first data size is greater than the predetermined data size threshold value;
sending the first training data to a quantum computing device in response to determining that the first data size is greater than the predetermined data size threshold value, wherein:
the quantum computing device is configured to process data using quantum bits; and
the quantum computing device is configured to train a first machine learning model using the first training data;
receiving a first set of machine learning model parameters comprising a first set of weight coefficients from the quantum computing device in response to training the first machine learning model, wherein the first set of machine learning model parameters correspond with a global minima value for the first training data; and
configuring a second machine learning model from among a plurality of machine learning models using the first set of machine learning model parameters, wherein the second machine learning model is configured to:
receive user information identifying a user and a data identifier identifying a data element; and
output an access response indicating whether the user is approved for accessing the data element;
receiving an access control request comprising a plurality of entries, wherein each entry identifies:
data identifiers for a plurality of data elements; and
user information comprising user identifiers for a plurality of users, wherein each user identifier is linked with one or more data identifiers for data elements a corresponding user is requesting permission to access;
determining if a second data size of the access control request is greater than the predetermined data size threshold value, wherein the second data size is determined based on a number of entries in the access control request; and
in response to determining that the second data size of the access control request is greater than the predetermined data size threshold value, utilizing the second machine learning model to determine if each of the user identifiers is approved to access a corresponding data element linked with the one or more data identifiers, wherein the second machine learning model is configured with the first set of machine learning model parameters that correspond with the global minima value.

9. The method of claim 8, further comprising:
receiving a second training data comprising a second set of user information for a second plurality of users and a second set of data identifiers for a second plurality of data elements;
determining a third data size for the second training data based at least in part on a number of entries in the second training data;
comparing the third data size to the predetermined data size threshold value;

determining the third data size is less than or equal to the predetermined data size threshold value;

training a third machine learning model locally using the second training data in response to determining that the first data size is less than or equal to the predetermined data size threshold value, wherein training the third machine learning model locally generates a second set of machine learning model parameters comprising a second set of weight coefficients that correspond with a local minima value for the second training data; and configuring a fourth machine learning model from among the plurality of machine learning models using the second set of machine learning model parameters.

10. The method of claim 8, further comprising:

selecting a machine learning model from among the plurality of machine learning models based on the number of entries in the access control request, wherein:
the selected machine learning model is configured to use machine learning model parameters for a local minima when the number of entries in the access control request is less than or equal to the predetermined data size threshold value;

inputting the user information and the data identifiers into the selected machine learning model; and obtaining an access response from the selected machine learning model in response to inputting the user information and the data identifiers into the selected machine learning model, wherein the access response indicates whether each user identifier is approved for accessing a data element.

11. The method of claim 10, wherein the access response comprises machine-executable instructions for decrypting an encrypted data element within a digital document.

12. The method of claim 10, wherein the access response comprises machine-executable instructions for modifying a digital document to provide access to a data element within the digital document.

13. The method of claim 10, wherein the access response comprises machine-executable instructions for modifying a digital document to provide access to the digital document.

14. The method of claim 10, wherein the access response comprises machine-executable instructions for modifying permission settings on a user device for the user.

15. A non-transitory computer-readable medium storing instructions that when executed by a processor cause the processor to:

receive a first training data comprising a first set of user information for a first plurality of users and a first set of data identifiers for a first plurality of data elements;

determine a first data size for the first training data based at least in part on a number of entries in the first training data;

compare the first data size to a predetermined data size threshold value;

determine the first data size is greater than the predetermined data size threshold value;

send the first training data to a quantum computing device in response to determining that the first data size is greater than the predetermined data size threshold value, wherein:
the quantum computing device is configured to process data using quantum bits; and
the quantum computing device is configured to train a first machine learning model using the first training data;

receive a first set of machine learning model parameters comprising a first set of weight coefficients from the quantum computing device in response to training the first machine learning model, wherein the first set of machine learning model parameters correspond with a global minima value for the first training data; and configure a second machine learning model from among a plurality of machine learning models using the first set of machine learning model parameters, wherein the second machine learning model is configured to:
receive user information identifying a user and a data identifier identifying a data element; and
output an access response indicating whether the user is approved for accessing the data element;

receive an access control request comprising a plurality of entries, wherein each entry identifies:
data identifiers for a plurality of data elements; and
user information comprising user identifiers for a plurality of users, wherein each user identifier is linked with one or more data identifiers for data elements a corresponding user is requesting permission to access;

determine if a second data size of the access control request is greater than the predetermined data size threshold value, wherein the second data size is determined based on a number of entries in the access control request; and in response to determining that the second data size of the access control request is greater than the predetermined data size threshold value, utilize the second machine learning model to determine if each of the user identifiers is approved to access a corresponding data element linked with the one or more data identifiers, wherein the second machine learning model is configured with the first set of machine learning model parameters that correspond with the global minima value.

16. The non-transitory computer-readable medium of claim 15, wherein the instructions further cause the processor to:

receive a second training data comprising a second set of user information for a second plurality of users and a second set of data identifiers for a second plurality of data elements;

determine a third data size for the second training data based at least in part on a number of entries in the second training data;

compare the third data size to the predetermined data size threshold value;

determine the third data size is less than or equal to the predetermined data size threshold value;

train a third machine learning model locally using the second training data in response to determining that the first data size is less than or equal to the predetermined data size threshold value, wherein training the third machine learning model locally generates a second set of machine learning model parameters comprising a second set of weight coefficients that correspond with a local minima value for the second training data; and configure a fourth machine learning model from among the plurality of machine learning models using the second set of machine learning model parameters.

17. The non-transitory computer-readable medium of claim 15, wherein the instructions further cause the processor to:

select a machine learning model from among the plurality of machine learning models based on the number of entries in the access control request, wherein:
the selected machine learning model is configured to use machine learning model parameters for a local minima when the number of entries in the access control request is less than or equal to the predetermined data size threshold value;
input the user information and the data identifiers into the selected machine learning model; and
obtain an access response from the selected machine learning model in response to inputting the user information and the data identifiers into the selected machine learning model, wherein the access response indicates whether each user identifier is approved for accessing a data element.

18. The non-transitory computer-readable medium of claim 17, wherein the access response comprises machine-executable instructions for modifying a digital document to provide access to a data element within the digital document.

19. The non-transitory computer-readable medium of claim 17, wherein the access response comprises machine-executable instructions for modifying a digital document to provide access to the digital document.

20. The non-transitory computer-readable medium of claim 17, wherein the access response comprises machine-executable instructions for modifying permission settings on a user device for the user.

* * * * *